Jan. 26, 1954

T. G. NELSON
FRUIT JUICER 2,667,118

Filed Aug. 24, 1946

INVENTOR
Talbert G. Nelson
BY
Dale A. Bauer.
ATTORNEY

Jan. 26, 1954

T. G. NELSON 2,667,118

FRUIT JUICER

Filed Aug. 24, 1946

INVENTOR
Talbert G. Nelson
BY
Dale A. Bauer
ATTORNEY

Jan. 26, 1954  T. G. NELSON  2,667,118
FRUIT JUICER

Filed Aug. 24, 1946  8 Sheets-Sheet 5

INVENTOR
*Talbert G. Nelson*
BY
*Dale A. Bauer*
ATTORNEY

Jan. 26, 1954 T. G. NELSON 2,667,118
FRUIT JUICER
Filed Aug. 24, 1946 8 Sheets-Sheet 6

INVENTOR
*Talbert G. Nelson*
BY
*Dale A. Bauer*
ATTORNEY

Jan. 26, 1954

T. G. NELSON 2,667,118

FRUIT JUICER

Filed Aug. 24, 1946

INVENTOR
Talbert G. Nelson
BY
Dale A. Bauer
ATTORNEY

Jan. 26, 1954 T. G. NELSON 2,667,118
FRUIT JUICER
Filed Aug. 24, 1946 8 Sheets-Sheet 8

Fig.18.

INVENTOR
*Talbert G. Nelson*
BY
*Dale A. Bauer*
ATTORNEY

Patented Jan. 26, 1954

2,667,118

UNITED STATES PATENT OFFICE 2,667,118

FRUIT JUICER

Talbert G. Nelson, New York, N. Y.

Application August 24, 1946, Serial No. 692,800

43 Claims. (Cl. 100—97)

This invention relates to a fruit juicer, particularly to an orange juicer. More oranges are squeezed to provide juice than any other fruit so the invention will be described in particular relation to the squeezing of oranges, but it is to be understood that the principles of the invention are applicable to other fruit. The design of the particular machine herein described is for the accommodation of ball-shaped fruit, but fruit of other and less symmetrical shapes can be accommodated by alterations of the design.

The standard orange juicer of the prior art consists essentially of two conical squeezing elements, one element of which is moved by a rack and pinion to press one half of the fruit against the other element. Persons interested in operational efficiency have discovered that there are twelve separate operations in the squeezing of a single orange. Considering the vast number of oranges that are squeezed daily it becomes apparent that there is involved a labor and handling problem of considerable magnitude.

It is an object of this invention to construct a mechanism adapted to remove oranges from a bin and to feed them to squeezing apparatus as needed.

Another object of the invention is to construct an apparatus adapted to remove articles from a bin and to deliver them, for instance, to a chute or other means of transportation.

Heretofore difficulty has been experienced, not only in removing oranges from bins containing them for use as desired, but in feeding the oranges one by one to apparatus as needed. It is an object of this invention to construct a mechanism coordinated with the bin discharge means and with the squeezer elements of our novel orange juicer whereby oranges may be delivered one by one to the squeezer elements as needed.

Basically, the simplest operation in the squeezing of an orange is the cutting thereof although even that process has problems solved by this invention, but it is in the handling of the parts of the halved orange that the greatest difficulty arises. The halves of the orange, when cut by the knife, are unbalanced, unsymmetrical, and yet must be accurately positioned between the squeezer elements. It is not too easy for a person working manually to correctly position a half orange between two squeezers so that the juice will all be expelled from the pulp without expressing the protective oils from the skin, and without splitting the skin. To construct an orange juicer to perform that function automatically is even more difficult, and to construct one that will handle both halves of the orange simultaneously, presents problems which have not heretofore been solved. It is therefore an object of this invention to construct a machine capable of taking oranges as delivered, of splitting them into substantially equal halves without clinging to or rolling on the knife, and of handling the halves so that they are quickly and accurately positioned between squeezing elements so that the squeezing elements may operate to remove the juice from the pulp without removing the undesirable constituents from, or tearing, the rind.

Squeezing is carried out by cooperating concave and convex squeezing elements which are so shaped that the squeezed rind has a tendency to adhere to them, and so that a vacuum tends to be set up between the skin and the squeezer elements, making removal difficult. It is an object of the invention to automatically remove the rinds from the squeezer elements and from the machine after the juice has been expelled therefrom.

The best known method of storing orange juice is within the orange. Therefore, it is desirable that the oranges should be squeezed just before use except in those instances where great quantities of oranges are to be squeezed for canning. In normal restaurant practice it is desirable to store the oranges in a bin in the squeezing machine itself and to feed them selectively and automatically to the squeezers as juice is called for, but the problem of getting the oranges out of the bin had not heretofore been solved, and the problem of selectively squeezing one or a plurality of oranges or of continuously squeezing a multiplicity of oranges with no more attention than the pushing of a selected button had not been successfully approached. It is therefore an object of this invention to construct an orange squeezer which will store oranges in a bin, remove them from the bin, and feed them selectively as desired to squeezing apparatus that automatically disposes of the skins, so that the only attention required of an attendant is to occasionally load whole oranges into the bin and to press a button for the squeezing of a selected number, all other operations being automatically carried out by the machine.

Another object is to assemble in a single unit that protects the machine parts, the elements of a juicer that contact the juice so that they can be removed as a unit and washed quickly and thoroughly without disturbing the power parts of the apparatus.

Yet another object of the invention is to construct selective operating mechanism for the fruit juicer that will select, slice, and squeeze one, several, or an indefinite plurality of fruits.

Among the elements and constructions of particular novelty that are embodied in this application are the method of removing fruit from a bin, the escapement for feeding fruit along a gravity line, the apparatus for slicing and particularly for handling the sliced parts of fruit, the squeezing apparatus with its means for disengagement of rinds, the interconnection of these and other parts in a coordinated whole, and the mechanism for selectively operating the machine upon one or a selected plurality of fruits. These elements of novelty vary in their relative importance, and in the width of their application, some of them being most useful in connection with fruit juicing apparatus and some being of much wider application. It is to be understood that this list of new and useful functions and apparatus is not intended to be complete, but to be representative of the general advance which has been made by this invention in the arts in which it applies.

The above and further objects and novel features of the invention will more fully appear from the following description when the same is read in connection with the accompanying drawings. It is to be expressly understood, however, that the drawings are for the purpose of illustration only and do not constitute a definition of the limits of the invention, reference for this latter purpose being had primarily to the appended claims.

In the drawings, wherein like reference characters refer to like parts throughout the several views.

Fig. 7 is a sectional view on the line 7—7 of Fig. 6.

Fig. 7a is a detail view on line 7a—7a of Fig. 6;

Figures 1, 3, 4:
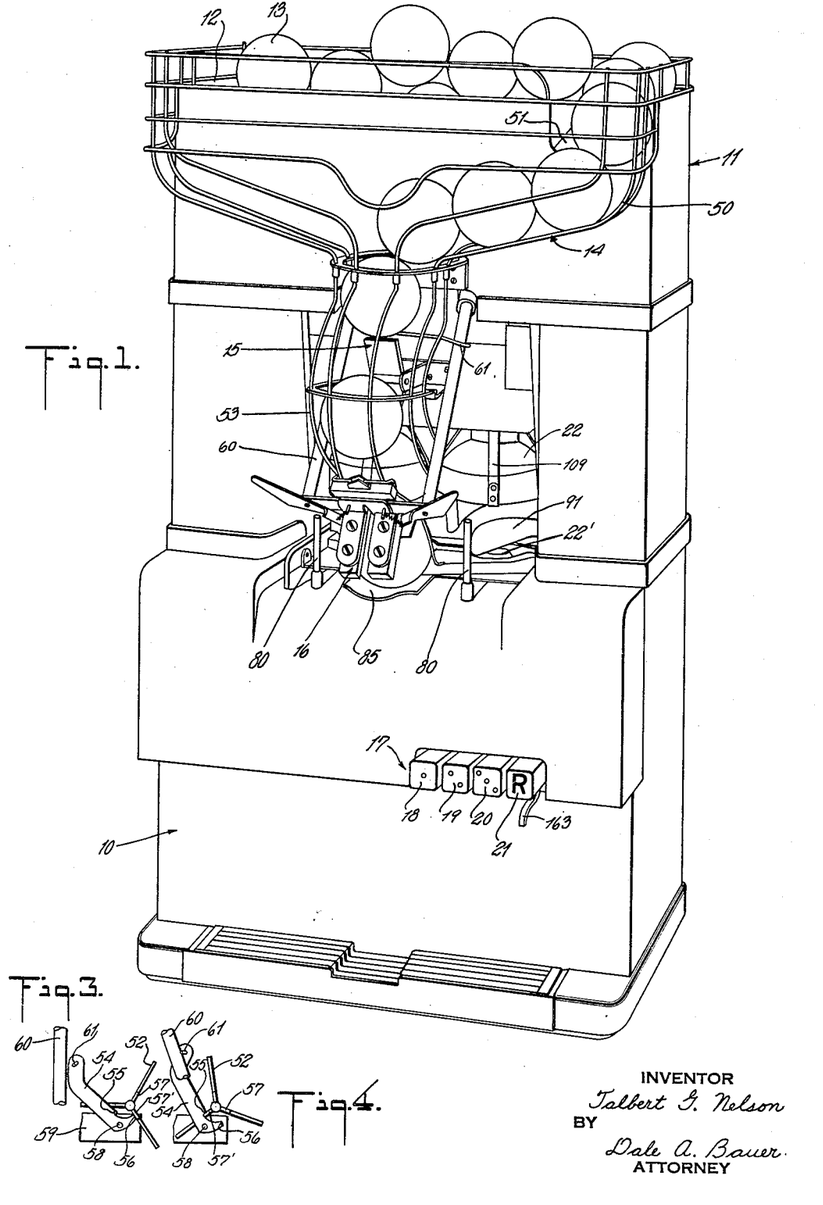
Fig. 1 is a perspective view of an orange juicer embodying the principles of the invention.
Figs. 3 and 4 are details of the escapement in operation.

The numeral 10 of the drawings indicates generally an orange juicer having a cover 11 shown only in Fig. 1, a bin 12 containing oranges 13, a chute 14 by which the oranges are delivered to the slicing and squeezing mechanism, an escapement 15, slicing and handling mechanism 16, and controls 17. Controls 17 have four buttons 18, 19, 20, and 21. When button 18 is pushed the machine cuts and squeezes a single orange. When the button 19 is pushed, the machine cuts and squeezes two oranges. When the button 20 is pushed, it squeezes three oranges, and when button 21 is pushed, the machine squeezes oranges continuously. Also shown in Fig. 1 are the upper squeezer elements 22.

Figure 6:
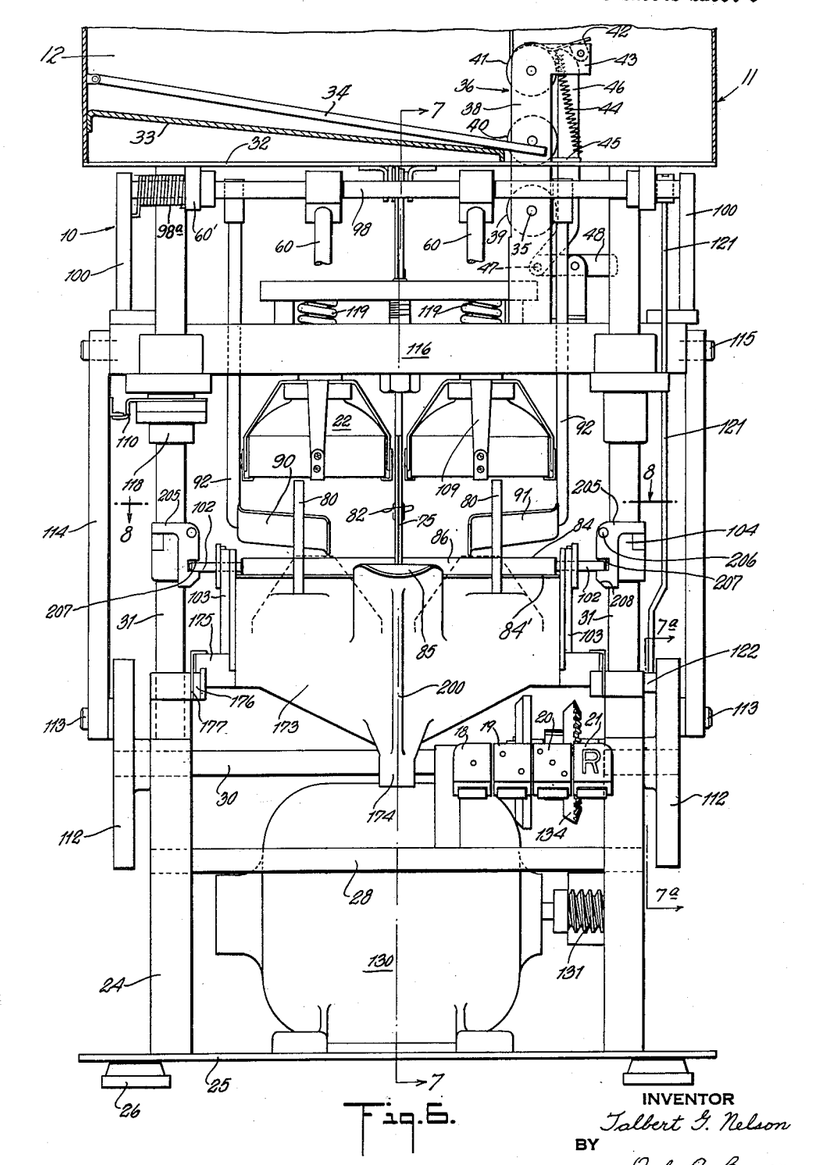
Fig. 6 is a front elevational view of the machine with the cover and bin removed.

The frame 24 of the machine is a rectangular structure having a base 25, feet 26, braces 27, 28 and top side members 29 in which are mounted the bearings for the drive shaft 30. Carried by the side frame members 29 are four standards 31 which are preferably tubular posts adapted to serve as guides for certain of the moving parts and as supports for other fixed parts. Among the fixed parts carried by these supports is the bin 12 which is attached to the upper ends thereof by its bottom plate 32. Within the bin is an inclined false bottom 33 which serves to roll the fruit toward the delivery side of the bin. In handling oranges, the inclination of the bottom 33 is material, in order to overcome the friction of the oranges against each other and against the sides of the bin. In addition, it has been found advisable to provide a kind of agitator 34 which comprises a flat bar pivoted at the side of the bin opposite the delivery and which is struck and lifted by a projecting end of an axle 35 on the elevator. This simple device serves adequately to free the fruit in the bin so that it may be readily taken by the elevator and discharged. An elevator 36 is mounted for vertical movement within the bin. Two supports 37, 38 are mounted on the reciprocating mechanism of the machine and carry a stack of spaced rollers 39, 40, 41 beneath the fruit support of the elevator which comprises a transversely concave plate 42 which is pivoted at its end to the ears 43 on the side members 37, 38. A spring 44 attached to a projection 45 on the elevator 36 and to the pivoted plate 42 holds the plate normally in such position that it is somewhat below the bottom 33 of the bin when in lowered position and positioned to retain the fruit when raised. In this position it may bear against the roller 41, as shown in Fig. 6, or by means of appropriate stops may be slightly spaced from the surfaces thereof. A push rod 46 is pivotally attached at its bottom end 47 to a lever 48, and at its upper end bears against the underside of the plate 42. The projection 45 may constitute a guide for the push rod 46. The proportions of the machine are such that when the elevator reaches the level of the top of the bin, the lever 48 strikes the underside 32 of the bin, thrusting the rod 46 against the plate 42, tipping it toward the chute 14, and emptying its contents over the wall of the bin into the chute.

In the inoperative position of the apparatus, the plate 42 forms in effect a grooved continuation of the bottom of the bin, into which the pitch of the bottom 33 rolls oranges. When the button 18 is pushed, the machine raises the elevator with its contents through the oranges in the bin, tips the oranges carried by the elevator into the chute from whence they roll down into the escapement 15, and returns the elevator to its original position while the escapement and the handling mechanism are juicing an orange. The rollers prevent the fruit from making its way beneath the elevator plate and interfering with its operation. Furthermore, they overcome the frictional resistance of the fruit skins in a manner technically satisfactory and satisfactory from the standpoint of power cost and motor size. This elevator is capable of use for unloading bins containing all types of commodities, including fruits other than oranges, vegetables, and balls of various sorts. Because of its wide utility, it is claimed in combination with the juicing apparatus herein described and more generically.

Figures 2, 5:
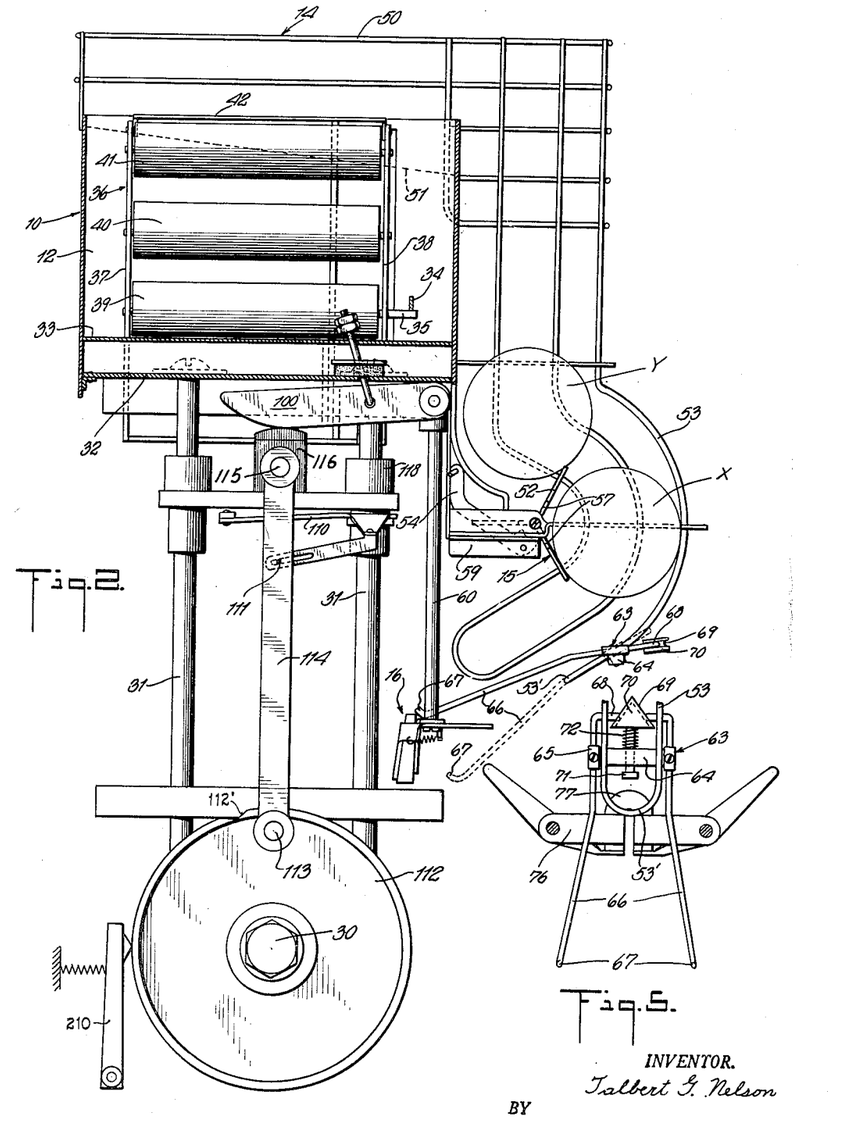
Fig. 2 is a side elevational view with the portion through the bin offset in proximity to the elevator.
Fig. 5 is a detail of the mechanism for delivering oranges at the end of the chute.
Figures 2, 2A:
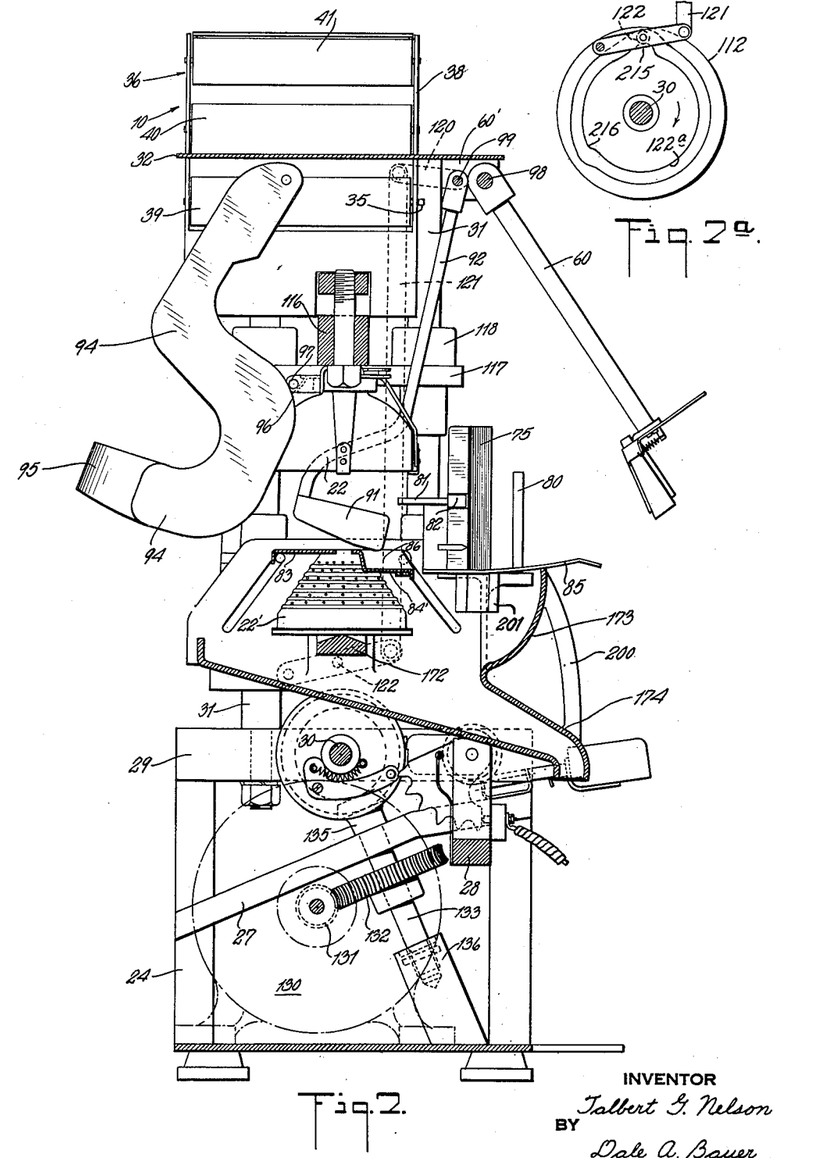

The chute 14 is composed in part of a wire cage 50 and in part of the inclined floor 51 adjacent the wall of the bin. The oranges delivered by the elevator to the chute 14 make their way downward as shown in Fig. 1 until they engage the escapement 15 which is designed to feed them one by one to the cutting mechanism. Details of the escapement are shown in Figs. 2, 3, and 4, wherein the numeral 52 indicates a paddle wheel pivotally mounted at the center of a curve 53 in the cage, the paddles of which project sufficiently far to arrest the progress of the oranges as they come in contact therewith. The paddles are cut away at one side to admit the escapement lever 54 which is provided with a shoulder 55 and an abutment 56. The reduced portion 57 of the paddle wheels meets the lever. The lever 54 is pivoted at 58 to a member 59 supported from the frame of the machine. Two pusher arms 60 are pivoted to the frame and carry at their ends pushers of unique design adapted to split the oranges by pressing them against a knife. When the machine is operated the pusher arms are first swung outward to admit an orange between them to the cutting apparatus and then swung inwardly against the orange to complete the cutting. As they swing outwardly, one of them engages a pin 61 on the lever 54, tilting the lever to the position shown in Fig. 4 and permitting the paddle 57' to escape from the abutment 56 and to turn until stopped by shoulder 55. This turn releases the orange X in Fig. 2. Further progress of the paddle wheel is arrested by the shoulder 55. When the arms 60 are thrust forward to press against the orange, the lever 54 and the motion of orange Y to position X is completed. The delivery of the orange between the pusher arms is of material importance in the machine and constitutes a notable part of the invention.

The outer wires 53 of the chute terminate in a loop 53' to which is attached a novel adjustable delivery fork 63 that is adapted to accommodate fruit of different sizes. This fork has support bar 64 mounted on the end 53' of the chute.

Pivotally mounted on the ends of the bar 64 are pivoted clamps 65 (see Figures 2 and 5) in which are held fingers 66 having upwardly hooked ends 67 and inwardly turned ends 68 which ride in the grooves 69 of a wedged-shaped member 70 which is supported on the end of a movable spindle 71 which is thrust by spring 72 against the ends of the fingers 66 tending to force them toward an inward position. Thus the fingers in their inmost position will accept fruit of small size, but as the weight of the fruit and its size increases, the fingers spread against the action of the wedge and spring 72, the angle of the wedge being sufficient to permit such spreading action, so that fruit of all sizes is properly balanced for delivery. The position of the hooked ends 67 of the fingers 66 and the position of the fingers is such that the fruit will be held thereby until it is engaged by the pusher and thrust against the knife.

A problem of great difficulty in the handling of fruit by splitting machines arises when the fruit is delivered to the knife. The fruit must be transferred to the knife in such position that it will be divided in half. It is not feasible to achieve a mathematical division of fruit so that even the best of apparatus achieves only an approximately equal division. This results in the presentation to the squeezers of halves of the fruit which are frequently of slightly different size. This apparatus has been constructed, and this is part of its novelty, to accommodate such approximations and also to accommodate differences in the thickness of skins that are subjected to squeezing. It is well known that the thickness of orange skins differs, some being thin and dense, others being thick and pulpy. The method and means by which the squeezers accommodate such differences is set forth in a copending application Serial No. 692,799, now Patent No. 2,629,317, issued February 24, 1953 and will be referred to only generally herein in order to set forth the novel combination that includes such means with other operating parts of this machine.

Figure 8:
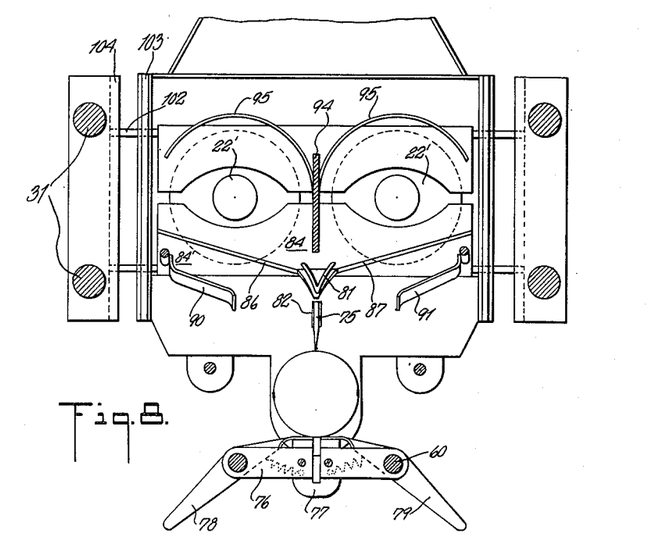
Fig. 8 is a section on the line 8—8 of Fig. 6.
Figure 9:
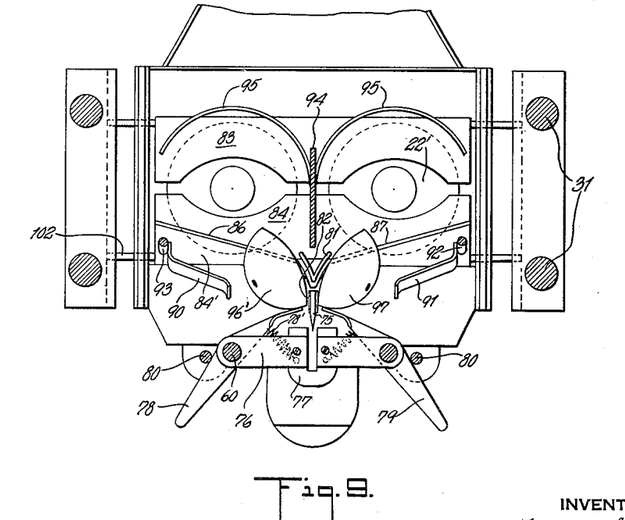
Fig. 9 is a section similar to Fig. 8 at a more advanced time in the cycle.
Figure 10:
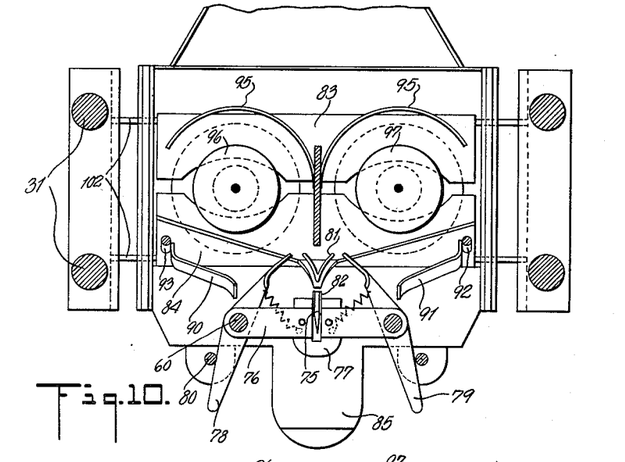
Figs. 10 and 11 are similar sections showing further stages in the cycle.

The splitter in this case is composed of a vertically arranged knife 75 which cooperates in a particular way with the novel pusher mechanism. At the lower end of the pusher arms 60 are supported two metal plates 76 which are joined at their innermost ends by a U-shaped yoke 77, shown in Figs. 8, 9, 10, and 11. The yoke 77 is adapted to receive the knife 75 as indicated in Fig. 10 so that the orange is completely severed and the parts thereof are thrust beyond the knife. To assist in thrusting the halves of the orange beyond the knife two levers 78, 79 are pivoted to the ends of the posts 60 and at their inner ends overlap the ends of the yoke 77 as shown in Fig. 8. Mounted on the frame of the machine are two posts 80 which engage the levers 78, 79 when the pusher reaches the position shown in Fig. 9, swinging the inner ends of the arms forward and outward, carrying the halves of the orange past the knife and along the faces of guides 81 which in effect pivot the halves about vertical axes into planes fronting the squeezer elements 22, 22'. The guides 81 are mounted behind the knife and separate therefrom. Elements 82 are attached to the knife and constitute ridges that break up the friction of the knife blade and fruit and prevent the clinging of the fruit to the blade and the rolling or folding of the skin along it. There may be several of these ridges. This motion is facilitated by platform members 83, 84 which are displaceably mounted on a level with the tops of the lower cones of the squeezer elements. The platform member 84 has a portion on a level with platform member 83 and another portion 84' on a level with the plate 85 which receives the orange from the chute. Connecting the two parts 84, 84' of the platform member are diagonal trip steps or lower guides 86, 87 against which the halves of the orange are thrust by the pusher arms 78, 79. The thrust of the arms, the effect of the guides, and the effect of the trip steps is ordinarily sufficient to lay the oranges face downward upon the platform in proper position beneath the squeezers, but this motion is also assisted by the sweeps 90, 91 which are carried at the ends of arms 92, 93 which are pivotally suspended from the same bracket that pivotally supports the arms 60. In their retracted position the sweeps serve as guides for the curved portions of the orange halves and as limits to the sideward motion thereof. The thrust of the pusher is sufficient to move the halves into proper alignment with the squeezer elements, but an additional device is adapted to prevent accidental displacement. This device comprises a crooked arm 94 pivotally suspended on the frame and carrying at its lower end a pair of semi-circular guides 95 which serve to arrest the motion of the orange halves in proper position between the squeezers. One surface 96 of the crooked arm is a cam surface adapted to ride on a roller 97 carried by the supporting member for the movable squeezer elements. Thus, when the squeezer element is raised after squeezing the orange, and as the sweeps 90 and 91 eject the skins from the machine, the arm 94 is moved out of the way so that the guides 95 no longer obstruct the motion of the skins. As the pusher is retracted to admit another orange, springs 78' retract the levers 78, 79.

The trip steps can be replaced with some success by inclined, flat surfaces. Thus, the leading parts of the platform members may be bent down and diagonally, and will trip the orange halves as described.

Figure 11:
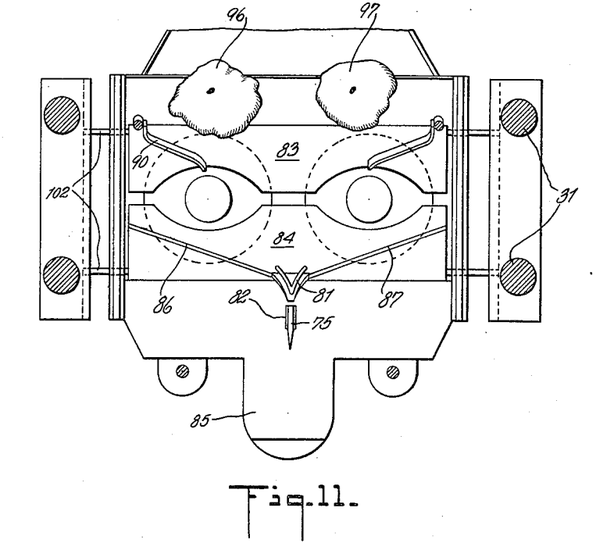
Figures 12, 17:
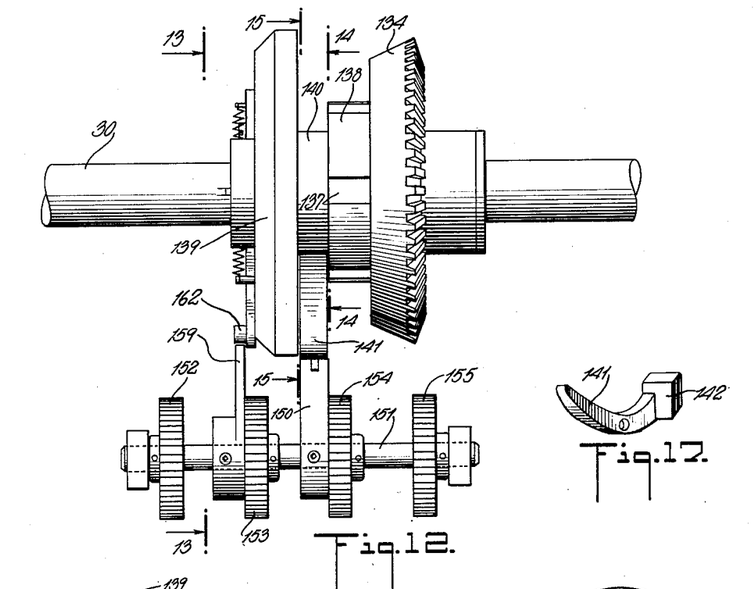
Fig. 12 is a detail of the driving and selector mechanism.
Fig. 17 is a detail of the clutch lever.

In Fig. 8 the orange is shown as it is being thrust upon the knife by the pusher, the sweeps being retracted and the pusher wings or levers flat against the front ends of the yoke. The arm 94 is in its innermost position with the guides 95 in position to prevent the orange halves from overshooting their proper position on the platform. In Fig. 9, the orange has been halved by the knife and the levers 78, 79 are pushing the halves outward against the guides and the trip step of the platform, accomplishing thus in one motion the pivoting of the halves about the vertical axes into approximate alignment with the respective squeezers. In Fig. 10, the orange halves, which are generally indicated by the numerals 96', 97, have been properly positioned between the squeezers, the levers 78, 79 being shown in their most advanced position, and the knife being sheathed within the yoke 77. Fig. 11 shows the action of the sweeps 90, 91 in ejecting the squeezed skins 96', 97 from between the squeezers.

The pusher arms 60 are fixedly mounted upon a shaft 98 which is mounted in brackets 60' supported by the bottom member 32 of the bin. The projecting ends of the shaft 98 support rocker arms 100 which ride upon the beam 116. The shaft 98 and the arms 60 are biased to retracted position by springs, such as torsion spring 98a (Fig. 6). Also mounted in the brackets 60' is a rock shaft 99 to which is keyed the sweep arms 92. The rock shaft 99 is rocked by a projecting lever 120 which is connected by means of a rod 121 to a follower 122 which is constrained to work vertically in a cam groove 122a (Fig. 7a) in the inner face of disk 112, said groove comprising a large lobe 215 for effecting movement of sweeps 90, 91 to the position illustrated in Fig. 7 for removing the rinds from the platform members 83, 84 and a smaller lobe 216 for moving the sweeps 90, 91 a short distance from retracted position to assist in tipping the halves of the fruit onto said platform members between the squeezer elements.

The apparatus as thus described stores fruit for use as needed, provides means for delivering fruit from the storage bin in a quantity sufficient to supply the continuous operation of the machine, delivers the fruit one by one to the handling and slicing mechanism, slices the fruit into approximately equal halves, and lays the halves flat side downward between twin squeezer elements in position to be efficiently squeezed, and ejects the refuse from the apparatus. These functions are accomplished by novel means for handling the fruit in the storage compartment or bin, by novel means for delivering the fruit singly to the cutting mechanism, and for accommodating fruit of different size, by means for pivoting the fruit first about vertical, then about horizontal axes into alignment with the squeezers, and finally for ejecting the pressed skins.

In addition to these functions, the machine performs additional ones. In the identified copending case is described the squeezing mechanism and the mechanism for removing the squeezed skins from the squeezers after the expulsion of the juice, a novel mechanism of comparatively simple construction which is coordinated with the mechanism herein more particularly described and forming a part of the general novel combination. Briefly described, that novel mechanism comprises upper and lower squeezer elements 22, 22', and platforms 83, 84 which serve to support the orange halves in position between the squeezer elements until squeezing begins, to steady the halves while squeezing progresses, and to free the squeezed skins from the lower cones after squeezing. The platform halves 83, 84 move downward with the upper squeezer elements and outward at an angle substantially equal to the angle of the lower cone, being returned to position by springs when the squeezing has been completed. These platform elements are mounted on rods 102 which are guided diagonally by guides 103 and horizontally by guides 104, which move with the platform members. The guides 103 do not move with the platform members, but are fixed to the sides of the trough unit.

Figures 13, 14, 15, 16:
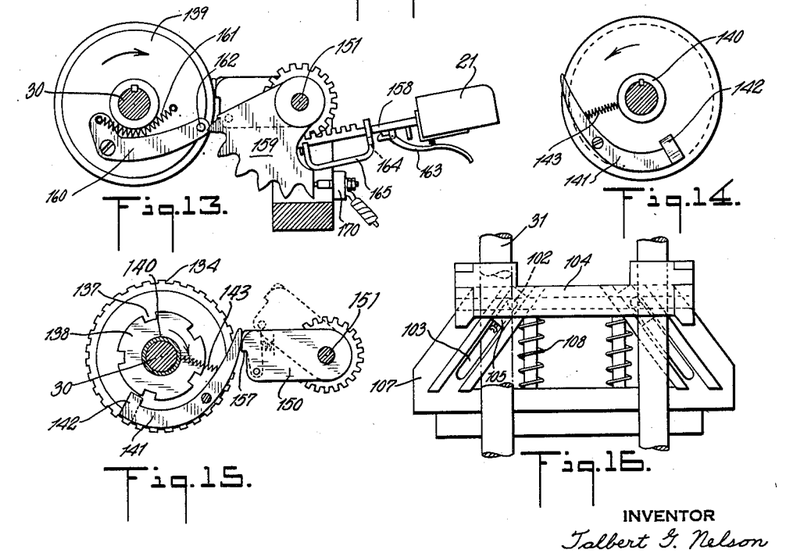
Fig. 13 is a section on the line 13—13 of Fig. 12.
Fig. 14 is a section on the line 14—14 of Fig. 12.
Fig. 15 is a section on the line 15—15 of Fig. 12.
Fig. 16 is a diagrammatic end view of the mechanism for moving the platform members.

Fig. 16 illustrates the general principle employed in connection with the movable platform members, the ends of rods 102 being mounted in bearings in guides 105 which are diagonally slidable in guide ways 103 in the juice trough 173 mounted on the frame of the machine. Slidably mounted on the upright posts 31 are guide members 104 having horizontal slots 207 in which the ends of the rods 102 are received. The guides 104 reciprocate with the other reciprocable parts of the apparatus and uniformly with the guides 105, so that the platform members 83, 84 are displaced just in advance of the upper squeezer elements, being returned to position as the squeezers are retracted, by compression springs 108 (see Fig. 16), removing the emptied skins from the squeezers and placing them in the path of the sweeps.

The upper squeezer elements are provided with fingers 109 (Fig. 6) that conform to the interior shape of the squeezers and are reciprocable by the lever 110 (Fig. 2) which is pivotally mounted about a support 31 and is operated by a lost motion connection 111 from the crank shaft that drives the operating parts of the machine. The fingers move about the interior surface of the upper squeezer elements and dislodge the peel therefrom.

The coordination of the many operative parts and functions of the machine is itself a conception of high novelty and great utility, incorporating a selective driving gear possessed of particular advantages. Looking now particularly at Figs. 2, 6, 7, 12, and 15, a drive shaft 30 is mounted in bearings in the cross piece 29 of the frame, and supports on its projecting ends driving disks 112 to which are attached by pintles 113 connecting rods 114 which are pivotally connected at their upper ends by means of pintles 115 to a beam 116. A notch 112' in the rim of disk 112 cooperates with a spring pressed, cam faced detent 210 to stop the machine exactly at the end of its cycle when its power is cut off. The beam 116 is carried by, or carries, cross members 117 (Fig. 7) which have guides 118 slidable upon the guide posts 31. The upper squeezer elements 22 are mounted in the beam 116 by a connection which permits resilient contact with the fruit halves against the force of springs 119. This construction is more particularly described in the said copending application. The lever 110 is pivotally mounted about one of the guides 118. The rocker arms 110 ride upon the beam 116, and operate the pusher. The side members 37, 38 of the elevator are fixedly attached to the beam and may be guided by projecting brackets upon one or more of the guide posts 31.

A motor 130 drives through a worm 131 and a worm gear 132, a short shaft 133 which drives a bevel gear 134 through a bevel gear 135 on the end of the short shaft. The short shaft is supported in the frame member 27 and in a socket 136. The gear 134 is mounted for rotation about the shaft 30 and has a projecting collar 138 in which are clutch grooves 137. Keyed, or otherwise fixedly secured, to the shaft 30 is a clutch disk 139 bearing on its inner face a spacing collar 140 and a pivoted clutch lever 141, having a projecting clutch block 142 (Figs. 17 and 15) that is adapted to make fitting engagement under the thrust of spring 143 with the clutch grooves 137 on gear 134.

When the machine is at rest, the clutch element 141 is held in the position shown in Fig. 15, out of engagement with clutch member 138, by an arm 150 that is keyed to a shaft 151 mounted on the frame of the machine. This shaft carries four gears 152, 153, 154, and 155, although the number of gears could be greater or less, in accordance with the principles of operation to be described. The gears are keyed to the shaft so that when they are rotated the shaft will be turned an equal angular distance. The arm 150 is forked at its end and has a spring pressed dog 157 that is adapted to engage the end of lever 141.

The buttons 18, 19, 20, and 21 are mounted on the ends of rack bars 158 which are engaged with the respective gears 152 to 155, so that by pushing one of the buttons, its intermeshed gear may be made to rotate the shaft 151 and the parts carried thereby. Also attached to that shaft is a toothed segment 159, which is adapted to be engaged, when it is in operative position, by a striker arm 160 pivotally carried by the disk 139 and biased by a spring 161 toward a position at which the striker 162 is adapted to make contact with the teeth on the segment 159. The first button, 18, rotates the shaft 151 so as to interpose a single tooth of the segment 159 in the path of the striker. The button 19 interposes two teeth; the button 20, three teeth, and the button 21 one tooth. However, the button 21 and rack bar 158 carry a spring pressed latch 163 which is adapted to be engaged with the edge of a slot 164 on the support 165 in which the rack bar 158 slides. Consequently, when the rack bar is held in position by the latch 163, the striker is unable to return the segment 159 to its original position, but yields against the opposition of the spring 161 so that the machine continues to operate until the latch is released.

On the other hand, when the first button is pressed, the striker 162 hits the first tooth and returns the segment to its inoperative position on the first revolution, simultaneously returning the clutch bar 150 to a position which disengages the clutch. When button 19 is pressed, the first tooth of the segment is moved past the path of the striker and the second tooth is interposed in that path, so that the striker hits it on its first revolution and returns the shaft 151 part way to inoperative position, leaving the first tooth in the path of the striker. On the second revolution, the striker hits the first tooth and returns the segment to inoperative position. When button 20 is pressed, the segment is rotated until the third tooth is interposed in the path of the striker, which returns it to inoperative position in three revolutions.

A spring switch 170 for the motor 130 is mounted in the path of the segment 159, as shown in Fig. 13. When the segment is in inoperative position, the spring is compressed and the circuit broken. When the segment is in operative position, the spring switch automatically closes the circuit to the motor which runs until the switch is again opened by the pressure of the segment 159. The spring detent 210 is provided in contact with the wheel 112 or the clutch element 139 to hold the parts in proper place after the clutch has been disengaged, so that the cycle is begun and ended precisely, and the parts are held against accidental dislodgement while at rest. The detent is indicated on Fig. 2 at 210.

The feeding of oranges to the chute by the elevator, the selection of an orange by the escapement, the feeding of an orange to the cutter, the placing of the orange between the squeezers, the squeezing, the freeing of the skins from the squeezers, the discarding of the skins, and the return of the parts to inoperative, ready condition is all accomplished in a single cycle of the machine. A single cycle of approximately three seconds' duration is entirely satisfactory. The oranges are cut evenly, and squeezed cleanly without disrupting the skins and without squeezing the undesirable protective oils out of the skin into the juice.

The elements that touch the juice should be washed frequently, and the elements that are mainly power parts should be protected from contact with the juice. This I accomplish by assembling in one unit the trough that receives the juice, the convex squeezer elements, the platform or stripper members, and the knife, the relation of the parts being such that the convex squeezers sit within the trough so that juice does not squirt out during squeezing, and so that the whole assembly may be cleaned as a unit by a washing spray.

In Fig. 6 a trough 173 is shown, being provided with a spout 174 and side bars 175 running substantially the length of the sides of the trough. These bars are angle shaped, resting upon and fitting within guides 176 of conforming shape. Detents 177, attached to bars 175 keep the trough from being raised. A curved handle 200 may be grasped to withdraw the unit.

Figure 18:
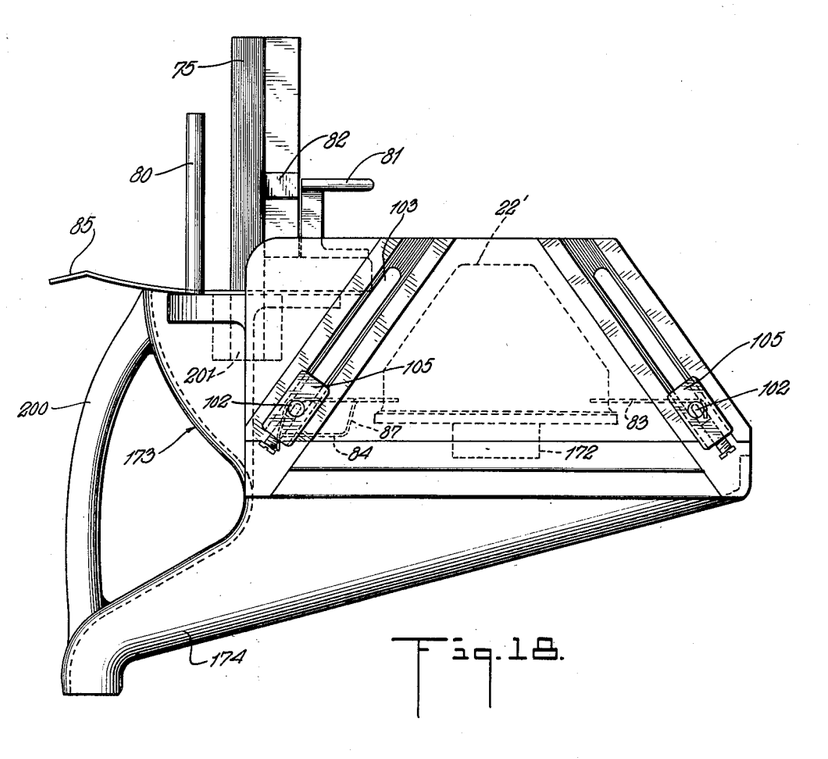
Fig. 18 is a side view of the juice unit.

A longitudinal section through the unit is shown in Fig. 7, a cross section is shown in Fig. 1, and a side view is shown in Fig. 18. The knife blade 75 fits in a socket 201, and the important guides 81, 82 are mounted behind the blade, materially aiding the cutting and the positioning of the fruit halves.

On the ends of the horizontal guides 104 are pivoted snap catches 205 as by means of pintles 206. These catches are normally held in the position shown in Fig. 6 by invisible springs and are provided with continuations 207 of the guide groove of guide 104 and with bevelled faces 208 located above the lower ends of guides 103. When the unit is to be removed for washing the beam 116 is moved to its lowest position, bringing the ends of rods 102 into the groove 207. The catches 205 are then swung outward, releasing the rods 102, and the beam is raised. By grasping the handle 200 the unit may be pulled out of its supports 176, washed, and replaced. When the machine is started the bevels 208 ride over the ends of rods 102, which snap into the grooves 207 and are carried up into their normal cycle. By thus providing for automatic engagement, accidental damage to parts by careless workers is prevented.

An advantage of the invention is in the general combination which automatically selects and squeezes an orange, or other fruit, delivers the juice, and disposes of the skin. This combination is particularly novel because heretofore it is believed, partly because of skin friction, that no successful means has been developed for removing oranges mechanically from a storage compartment and transferring them to cutting mechanism.

Another advantage of the invention is in the handling of the orange and its parts before and after cutting.

Yet another advantage of the invention is in the squeezing of the orange and in the removal of the skins from the squeezers.

A still further advantage of the invention is in the mechanism for coordinating all the parts of the apparatus and their functions, which is accomplished by simple means and parts, few of which require machining to close tolerances.

The machine is silent, smooth-working, and efficient in its operation whether operating on a single orange, on a selected plurality of oranges, or continuously. The pulp is fully expressed from the rinds, but the rinds remain unbroken.

As many apparently widely different embodiments of this invention may be made without departing from the spirit and scope thereof, it is to be understood that the invention is not limited to the specific embodiments thereof except as defined in the appended claims. What is claimed is:

1. A machine comprising a bin, a cradle support adapted to form a continuation of the bottom of the bin at one end thereof and to receive and hold lump articles therefrom, means to move lump articles in the bin onto the support, means to elevate the support and its contents above the level of the articles in the bin, and means movable with the support to hold back the articles in the bin from the path of the support in the bin when the support is elevated, said last-named means consisting of a plurality of rollers having the axes thereof parallel to each other and substantially perpendicular to the direction of movement of said support.

2. A machine comprising a bin, a cradle support adapted to form a continuation of the bottom of the bin and to receive and hold articles therefrom, means to move articles in the bin onto the support, means to elevate the support and its contents above the level of the articles in the bin, and means to reduce the friction of the articles in the bin against movement of the support when the latter is elevated comprising at least one roller positioned beneath the cradle support and adapted to be elevated therewith, said roller extending throughout the horizontal length of said support and having the axis thereof perpendicular to the direction of movement of said support.

3. A machine comprising a bin having an inclined bottom adapted to hold and to move articles by gravity toward one end thereof, a pivoted cradle adapted to form a continuation of the bottom and to receive and hold articles from the bin, means to elevate the cradle above the level of articles in the bin, means to hold the articles in the bin out of the path of said cradle when the same is elevated comprising a stack of rollers on parallel axes in a vertical plane underneath and movable with the cradle, said rollers being of about the same length as the cradle, and means to pivot the cradle to discharge from cradle and bin articles held by the cradle when the latter reaches its uppermost position.

4. A machine comprising a bin having an inclined bottom adapted to hold and to move articles by gravity toward one end thereof, a cradle adapted to form a continuation of the bottom and to receive and hold articles from the bin, means to elevate the cradle above the level of articles in the bin, means to hold back the articles in the bin comprising a stack of rollers underneath and movable with the cradle to occupy the path thereof in the bin when the cradle is elevated, each of said rollers being substantially co-extensive in axial length with the cradle, and means to tilt the cradle to discharge the contents thereof.

5. A machine comprising a bin having an inclined bottom adapted to direct articles by gravity toward one part thereof, a cradle adapted to form a continuation of the bottom and to receive and hold articles from the bin, means to elevate the cradle above the level of articles in the bin, means to hold the articles in the bin out of the path of the cradle when the latter is elevated comprising a stack of rollers underneath and movable with the cradle in the path thereof, means to tilt the cradle to discharge the contents thereof, and means to receive the contents of the cradle and to transfer it away from the bin.

6. A machine comprising an elevator having an elongated cradle for receiving a plurality of articles in single file along the length thereof, said cradle being pivotally mounted to permit tilting thereof relative to the remainder of the elevator, means to tilt the cradle independently of the remainder of the elevator to simultaneously dump said articles, means adapted to receive articles from the cradle and to move them in single file by gravity comprising a chute, escapement means in said chute adapted to control the movement of the articles, and means coordinated with the elevator to operate the escapement.

7. A machine comprising an elevator having a cradle, means adapted to receive articles from the cradle and to move them in single file by gravity comprising a chute having a reverse curve, a paddle wheel escapement in said reverse curve adapted to separate and control the movement of the articles, said escapement being operable in part by the weight of the articles, and means coordinating the operation of the elevator and the escapement.

8. A machine comprising a slicer including a knife and an article pusher, a chute adapted to contain articles moving in line by gravity, a rotatable paddle wheel having a plurality of circumferentially spaced paddles projecting into said chute and operable by said articles whereby to separate articles in said chute for movement one by one, escapement means adapted to control the rotational movement of the paddle wheel by said articles whereby to permit movement thereof in one direction only to intermittently release the articles singly, and means coordinating the movement of the pusher and the escapement.

9. A machine having a delivery chute, pivoted fingers projecting therefrom having inturned ends, a grooved wedge engaging the inturned ends of the fingers, and spring means bearing upon the wedge thereby to urge the fingers toward a predetermined position.

10. A machine having a delivery chute terminating in horizontally and vertically pivoted fingers, having hooked ends constructed and arranged to hold articles for delivery, biased by spring responsive means toward each other whereby to accommodate articles of different size.

11. A machine comprising working elements, means to move an article horizontally toward the working elements, means to split the article as it moves, means including pivoted guide members to lay the halves of the article between the working elements, and means coordinated with the working elements for effecting movement of said guide members into engagement with the residuary parts of the articles to remove the same from between the working elements after working.

12. A machine comprising pairs of working elements, a work table between said elements, means to move an article horizontally toward the working elements, means to split the article as it moves, means including pivoted guide members to lay the halves of the article upon the work table between the working elements, and means coordinated with the working elements for effecting movement of said guide members into engagement with the residuary parts of the article to remove the same from between the working elements after working.

13. A machine comprising pairs of working elements, a work table between said elements, means to move an article horizontally toward the working elements, means to split the article as it moves, means to pivot the split parts of the article about vertical axes, means to lay the split faces of the article upon the table between the working elements, and means to remove the residuary parts of the article from between the working elements after working.

14. A machine comprising pairs of working elements, a work table between said elements, means to move an article toward the working elements, means to split the moving article vertically, means to pivot the split parts of the article about vertical axes, means to lay the split parts of the article upon the table between the working elements, and means to remove the residuary parts of the article from between the working elements after working.

15. A machine comprising pairs of working elements, a work table between said elements, means to move an article toward the working elements, means to split the moving article vertically, means to pivot the split parts of the article about vertical axes, and means to pivot the split parts of the article about horizontal axes whereby to bring them upon the work table between the working elements.

16. A machine comprising pairs of working elements, a work table between said elements, means to move an article toward the working elements, means to split the moving article vertically, means to pivot the split parts of the article about vertical axes, means to pivot the split parts of the article about horizontal axes whereby to bring them upon the work table between the working elements, and means to remove the residuary parts of the article from between the working elements after working.

17. A machine comprising pairs of working elements, a work table between said elements, means to move an article toward the working elements, means to split the moving article, and means comprising a step in front of the work table and a pusher to trip and move the parts of the article into position between the working elements.

18. A machine comprising pairs of working elements, a work table between said elements, means to move an article toward the working elements, means to split the moving article vertically, means to push the parts thereof apart, means to guide the split parts of the article into position facing the work table, and means comprising a step in front of the work table to trip the split parts of the article about horizontal axes into position between the working element.

19. A machine comprising pairs of working elements, a work table between said elements, means to move an article toward the working elements, a vertical knife, a pusher adapted to split the article upon the knife, means to guide the parts of the article into position confronting the work table comprising elements upon the pusher adapted to separate the parts of the article, means to remove the residuary parts of the article from between the working elements after working, and means comprising a step in front of the work table and parts of the said residuary removal means cooperating to trip the split parts of the article into position between the working elements.

20. A machine comprising a knife having a substantially vertical cutting edge, means to deliver an article to the knife, means to receive the article and to support it in proximity to the knife, means to move the article horizontally to split the article upon the knife, means including pivoted guide members to lay the split parts upon a work table, and means for actuating said guide members to cause the same to engage the worked parts to move the same off the work table.

21. A machine comprising a work table, work elements adapted to work articles carried by the work table, means to split an article and move it onto the table between the work elements, means to arrest its progress when it is properly positioned, means to sweep the work table after completion of the working, and means to displace the arresting means to allow the sweeping means to perform its function.

22. Means to position the two parts of a split article, such as an orange, between the squeezer elements of a fruit juicer comprising means to move and guide the parts on edge to positions in front of said squeezer elements, and means to tip the parts through approximately 90° to position the same, cut faces down, between the squeezer elements.

23. A fruit juicer comprising squeezer elements, means to deliver fruit to said squeezer elements, means to dispose of the refuse, and power operated counting means to selectively control the operation of the juicer to squeeze one or a plurality of fruits.

24. A fruit juicer comprising a fruit delivery means, a fruit slicer, a fruit squeezer, refuse disposal means, and power operated counting means to coordinate and operate said parts whereby a single fruit may be squeezed, a selected plurality of fruits may be squeezed, or squeezing may be continuously carried on.

25. A fruit juicer machine comprising means to deliver fruit to a squeezer, means to squeeze the fruit, means to eject the rind, means to set the machine to squeeze a selected number of the fruit, and means to squeeze fruit continuously.

26. A fruit juicer machine comprising means to deliver fruit to a squeezer, means to operate the squeezer, means to eject the rind, and means to operate and to coordinate the said means comprising a drive shaft, a driving gear rotatable about said shaft and having a clutch element, a cooperative clutch element keyed to the shaft, means to engage the clutch elements whereby to drive the drive shaft, and means to stop the machine after a selected period of operation.

27. A fruit juicer comprising means to deliver fruit to a squeezer, means to operate the squeezer, means to eject the rind, and means to operate and to coordinate said means comprising a drive shaft, a driving gear rotatable about said shaft and having a clutch element, a cooperative clutch element keyed to the shaft, cycling means comprising a setting shaft and segment, means operable by said cycling means whereby the clutch is engaged, and a striker arm carried by said clutch element adapted to move the setting shaft into inoperative position after a predetermined cycle of operation.

28. A fruit juicer comprising means to deliver fruit to a squeezer, means to operate the squeezer, means to eject the rind, and means to operate and to coordinate the said means comprising a drive shaft, a driving gear rotatable about said shaft and having a notched clutch collar, a clutch element keyed to the shaft having a clutch lever pivoted thereto with a head adapted to enter the notches of the collar, a setting shaft, a toothed segment fixed thereto, means operable by said setting shaft to engage the clutch elements whereby to drive the drive shaft, a pivoted spring biased striker arm carried by the said clutch element, and means to move selected teeth of the toothed segment into the path of the striker arm as the clutch is engaged, whereby the striker arm may knock the setting shaft into inoperative position by sequentially engaging the teeth of said segment thereon.

29. A fruit juicer comprising means to deliver fruit to a squeezer, means to operate the squeezer, means to eject the rind, and means to operate and to coordinate the said means comprising a drive shaft, a driving gear rotatable about said shaft and having a notched clutch collar, a clutch element keyed to the shaft having a clutch lever pivoted thereto with a head adapted to enter the notches of the collar, a setting shaft, four gears keyed thereto, means to move one said gear, means to move another said gear twice as much, means to move a third gear three times as much as said first gear, means to move the fourth gear and lock it in position, means operable by said setting shaft to engage the clutch element with the clutch collar whereby to drive the drive shaft, a pivoted spring biased striker arm carried by said clutch element, and a toothed segment carried by the setting shaft adapted to be moved into the path of the striker arm as the clutch is engaged, whereby the striker arm may knock the setting shaft into inoperative position by engaging the teeth of said segment thereon sequentially, except when said locking means is employed.

30. An orange juicer having stripper plates each of which is movably mounted in a plurality of guides that are angularly arranged with respect to each other, and means on one said guide to release the plates and to automatically pick up the plates.

31. A fruit juicer comprising a frame, a squeezer cone supported by the frame, slotted guides in the sides of the frame having inclined angles substantially equal to the angles of the cones, sliders mounted for movement in the guides, spring suspended supports, a rod carried by and projecting from the sliders into horizontal grooves in said spring suspended supports, platform members carried by the rods in proximity to the cones, a cooperating squeezer, and means adapted to move the platform members down the side of the cone as the squeezing operation is performed.

32. A fruit juicer comprising a squeezer cone, means having angularly disposed guide ways therein, a platform member supported by studs, each of which projects into a plurality of said angularly disposed guide ways, means to move one of said guide ways to displace the platform member, a cooperating squeezer member, and means adapted to move the platform member out of the way of the cooperating squeezer member.

33. A fruit juicer comprising a squeezer cone, means having angularly disposed guide ways therein, a platform member supported by studs each of which projects into a plurality of said angularly disposed guide ways, and means to move one of said guide ways to displace the platform member.

34. A fruit juicer comprising a trough, a pair of squeezer cones, guides having oppositely inclined angles substantially equal to the angles of the cones, movable supports having horizontal grooves, rods carried in the guides and the grooves, platform members carried by the rods in proximity to the cones, cooperating movable squeezer cones, and means adapted to engage said supports whereby to move the platform members down the sides of the cones as the squeezing operation is performed.

35. A fruit juicer comprising a frame, a squeezer element, a rind stripper adapted to be carried in proximity to the squeezer element, guides for the rind stripper, the latter being mounted in said guides, a knife, and a trough detachable from the frame and carrying the squeezer element, the rind stripper, the guides, and the knife as a unit.

36. A machine as defined in claim 1 wherein said cradle support comprises a cradle member pivotally mounted on a pivotal axis parallel to the axes of said rollers, and means are provided to pivot said member about said axis for discharging said articles therefrom when it reaches its uppermost position.

37. In apparatus for elevating fruit or the like from a bin, an elevator mounted for vertical reciprocation and comprising spaced movable supporting arms, a cradle pivotally mounted on and substantially spanning the space between the tops of said arms, and parallel rollers mounted on and substantially spanning the space between said supporting arms below said cradle, the number of rollers being sufficient to occupy substantially the entire path of said cradle between the lowermost and uppermost positions of the latter.

38. A machine for extracting juice from fruits comprising a squeezer, means to deliver fruit to the squeezer, means to operate the squeezer, means to eject the rind after operation of the squeezer, and means to operate and coordinate the said first three means comprising a drive shaft, an electric motor, releasable clutch means for drivably connecting said motor and shaft, and control means for starting said motor and engaging said clutch and for automatically disengaging said clutch and stopping said motor after a pre-determined number of cycles of operation of the machine.

39. A machine for extracting juice from fruit comprising a bin for the fruit in bulk, a chute for directing said fruit in single file, elevator means for lifting fruit from the bin and delivering the same to said chute, fruit slicing means comprising a vertical knife and a fruit pusher, said knife and pusher being normally spaced to receive a fruit therebetween, a fruit support extending in front of said knife for supporting a fruit between said knife and pusher, means for releasing one fruit at a time for delivery by gravity through said chute onto said support between said knife and pusher, and means coordinated with said releasing means for actuating said pusher to push the fruit along said support past said knife to cut the fruit substantially in half.

40. A machine as defined in claim 37 wherein said support is concave to center the fruit delivered thereto with respect to the knife and to guide the movement thereof into engagement with the knife by the pusher.

41. A machine as defined in claim 39 comprising means including curved ledges diverging from said knife for supporting the halves of the cut fruit and guiding the on-edge movement thereof by said pusher.

42. A machine as defined in claim 41 comprising means for squeezing said halves to extract the juice therefrom, means for supporting said halves in position for action by said squeezing means, and means coordinated with said squeezing means and said pusher for tripping said halves over said ledges onto said supporting means therefor and moving the same to squeezing position.

43. A machine as defined in claim 42 comprising means for effecting actuation of said tripping means to remove the rinds from said supporting means after operation of the squeezing means on said halves.

TALBERT G. NELSON.

References Cited in the file of this patent
UNITED STATES PATENTS

| Number | Name | Date |
|---|---|---|
| 621,773 | Blatz | Mar. 21, 1899 |
| 930,021 | Arnold | Aug. 3, 1909 |
| 968,344 | Hackney | Aug. 23, 1910 |
| 1,058,821 | Welker et al. | Apr. 15, 1913 |
| 1,130,819 | Hill | Mar. 9, 1915 |
| 1,134,669 | Chiniquy et al. | Apr. 6, 1915 |
| 1,383,281 | Bailey | July 5, 1921 |
| 1,489,419 | Beechlyn | Apr. 8, 1924 |
| 1,555,929 | Allan | Oct. 5, 1925 |
| 1,597,439 | Fagan et al. | Aug. 24, 1926 |
| 1,609,994 | Ellis | Dec. 7, 1926 |
| 1,620,551 | Hughes | Mar. 8, 1927 |
| 1,686,884 | Trenor | Oct. 9, 1928 |
| 1,714,313 | Meisler | May 21, 1929 |
| 1,825,712 | Campbell | Oct. 6, 1931 |
| 1,834,300 | Wozniak et al. | Dec. 1, 1931 |
| 1,836,320 | Goranson et al. | Dec. 15, 1931 |
| 1,864,509 | Guamer | June 21, 1932 |
| 1,869,653 | Bauer | Aug. 2, 1932 |
| 1,883,528 | Faulds | Nov. 22, 1932 |
| 1,922,818 | Nordstrom | Aug. 15, 1933 |
| 1,990,774 | Butler | Feb. 12, 1935 |
| 2,065,271 | Faulds | Dec. 22, 1936 |
| 2,114,218 | Edenfield | Apr. 12, 1938 |
| 2,131,440 | Johnson | Sept. 27, 1938 |
| 2,234,991 | Todhunter | Mar. 18, 1941 |
| 2,279,833 | Madan | Apr. 14, 1942 |
| 2,311,565 | Nelson | Feb. 16, 1943 |
| 2,317,147 | Keene et al. | Apr. 20, 1943 |
| 2,353,841 | McKinnis | July 18, 1944 |
| 2,354,721 | Walker et al. | Aug. 1, 1944 |
| 2,387,211 | Barnby et al. | Oct. 16, 1945 |
| 2,472,876 | Ahrndt et al. | June 14, 1949 |
| 2,517,519 | Wurgaft | Aug. 1, 1950 |